(12) United States Patent
Fickes et al.

(10) Patent No.: US 9,778,618 B2
(45) Date of Patent: *Oct. 3, 2017

(54) MULTILAYER FILM AND AUTHENTICATION LABEL

(71) Applicant: DuPont Authentication, Inc., Wilmington, DE (US)

(72) Inventors: Michael G Fickes, Kennett Square, PA (US); Michael L Levin, Newark, DE (US)

(73) Assignee: DUPONT AUTHENTICATION INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/689,092

(22) Filed: Apr. 17, 2015

(65) Prior Publication Data

US 2015/0301499 A1      Oct. 22, 2015

Related U.S. Application Data

(60) Provisional application No. 61/981,238, filed on Apr. 18, 2014.

(51) Int. Cl.
   *G03H 1/02*     (2006.01)
   *G09F 3/03*     (2006.01)
   (Continued)

(52) U.S. Cl.
   CPC .............. *G03H 1/0011* (2013.01); *B32B 7/06* (2013.01); *B32B 7/12* (2013.01); *B32B 27/08* (2013.01); *B32B 27/14* (2013.01); *B32B 27/302* (2013.01); *B32B 27/304* (2013.01); *B32B 27/36* (2013.01); *G03H 1/0248* (2013.01);
   (Continued)

(58) Field of Classification Search
   None
   See application file for complete search history.

(56) References Cited

U.S. PATENT DOCUMENTS

4,589,686 A * 5/1986 McGrew .............. G02B 5/1842
                                              283/85
5,153,042 A    10/1992 Indrelie
(Continued)

FOREIGN PATENT DOCUMENTS

DE        19962638    *  7/2001
EP          585076    *  8/1993
(Continued)

OTHER PUBLICATIONS

Senderakova, "White Light Holograms", in Holography-Basic Principles and Contemporary Applications, Mihaylova, Ed., Chapter 3, (May 2013) pp. 61-86.*
(Continued)

*Primary Examiner* — Martin Angebranndt
(74) *Attorney, Agent, or Firm* — Oliff PLC

(57) ABSTRACT

In a first aspect, a multilayer film includes a holographic image layer, a first heat-shrinkable layer and a first adhesive layer between the holographic image layer and the first heat-shrinkable layer.

In a second aspect, an authentication label includes a holographic image layer, a first heat-shrinkable layer, a first adhesive layer between the holographic image layer and the first heat-shrinkable layer, and a back adhesive layer.

26 Claims, 2 Drawing Sheets

(51) Int. Cl.
*G09F 3/04* (2006.01)
*B32B 7/06* (2006.01)
*B32B 7/12* (2006.01)
*B32B 27/36* (2006.01)
*C09J 7/02* (2006.01)
*G03H 1/00* (2006.01)
*B32B 27/14* (2006.01)
*B32B 27/08* (2006.01)
*B32B 27/30* (2006.01)
*B32B 38/00* (2006.01)
*B32B 38/10* (2006.01)
*G09F 3/00* (2006.01)
*B32B 37/00* (2006.01)
*B32B 37/12* (2006.01)

(52) U.S. Cl.
CPC ......... *G03H 1/0252* (2013.01); *G03H 1/0256* (2013.01); *G03H 1/0272* (2013.01); *B32B 37/0015* (2013.01); *B32B 37/12* (2013.01); *B32B 38/0036* (2013.01); *B32B 38/10* (2013.01); *B32B 2250/05* (2013.01); *B32B 2270/00* (2013.01); *B32B 2307/40* (2013.01); *B32B 2307/736* (2013.01); *B32B 2439/00* (2013.01); *B32B 2519/00* (2013.01); *C09J 7/0296* (2013.01); *C09J 2203/334* (2013.01); *C09J 2425/006* (2013.01); *C09J 2427/006* (2013.01); *C09J 2433/00* (2013.01); *C09J 2467/006* (2013.01); *G03H 2210/30* (2013.01); *G03H 2240/50* (2013.01); *G03H 2250/10* (2013.01); *G03H 2250/35* (2013.01); *G03H 2250/39* (2013.01); *G03H 2250/40* (2013.01); *G03H 2250/44* (2013.01); *G09F 3/0291* (2013.01); *G09F 3/04* (2013.01)

(56) References Cited

U.S. PATENT DOCUMENTS

| | | | |
|---|---|---|---|
| 5,629,093 A | 5/1997 | Bischof et al. | |
| 5,797,492 A * | 8/1998 | Seki | G09F 13/04 206/387.1 |
| 5,851,615 A * | 12/1998 | Kay | B65D 55/026 428/195.1 |
| 5,884,425 A | 3/1999 | Baldwin | |
| 5,920,290 A | 7/1999 | McDonough et al. | |
| 6,005,691 A * | 12/1999 | Grot | G02B 5/1842 235/457 |
| 6,066,378 A | 5/2000 | Morii et al. | |
| 6,284,337 B1 * | 9/2001 | Lorimor | G09F 3/0292 283/107 |
| 6,344,245 B1 * | 2/2002 | Kay | B41M 3/14 427/164 |
| 6,506,468 B1 | 1/2003 | Morii et al. | |
| 6,706,354 B1 | 3/2004 | Otaki et al. | |
| 6,815,027 B2 | 11/2004 | Morii et al. | |
| 6,835,430 B2 | 12/2004 | Morii et al. | |
| 6,887,546 B2 | 5/2005 | Morii et al. | |
| 6,940,534 B2 | 9/2005 | Oshima et al. | |
| 7,095,324 B2 | 8/2006 | Conwell et al. | |
| 8,526,087 B2 * | 9/2013 | Shirakura | G03H 1/0011 359/3 |
| 8,678,289 B2 | 3/2014 | Roseman | |
| 2005/0243391 A1 * | 11/2005 | Drinkwater | B42D 15/025 359/31 |
| 2006/0221422 A1 * | 10/2006 | Mizushima | G03H 1/16 359/29 |
| 2009/0162756 A1 * | 6/2009 | Staub | G03H 1/0011 430/2 |
| 2010/0178438 A1 * | 7/2010 | Hikida | C08G 65/105 428/29 |
| 2010/0208313 A1 * | 8/2010 | Horgan | G03H 1/0005 359/2 |
| 2010/0276076 A1 * | 11/2010 | McDonnell | B44C 3/02 156/247 |
| 2015/0301500 A1 * | 10/2015 | Fickes | G03H 1/0011 359/2 |

FOREIGN PATENT DOCUMENTS

| | | |
|---|---|---|
| EP | 1168111 A2 | 1/2002 |
| EP | 1538554 A2 | 6/2005 |
| EP | 2377681 A1 | 10/2011 |
| GB | 2129739 A | 5/1984 |
| GB | 2298391 * | 2/1996 |
| GB | 2320615 A | 6/1998 |
| JP | 56-072067 * | 6/1981 |
| JP | 09-330940 * | 12/1997 |
| JP | 2003-123705 * | 4/2003 |
| JP | 2003-177672 * | 6/2003 |
| JP | 2007-011318 A | 1/2007 |
| JP | 2007/090567 A | 12/2007 |
| WO | 99/55791 A1 | 11/1999 |
| WO | 02/071376 A2 | 9/2002 |
| WO | 2013084079 * | 6/2013 |

OTHER PUBLICATIONS

McGrew, "Hologram counterfeiting problems and solutions", Proc. SPIE vol. 1210 pp. 66-76 (1990).*
International Search Report dated Jul. 1, 2015, PCT/US2015/026419 Filed Apr. 17, 2015.
Jul. 20, 2015 Search Report issued in International Patent Application No. PCT/US2015/026433.
Oct. 18, 2016 International Preliminary Report on Patentability issued in International Patent Application No. PCT/US2015/026433.

* cited by examiner

MULTILAYER FILM AND AUTHENTICATION LABEL

BACKGROUND INFORMATION

Field of the Disclosure

This disclosure relates to multilayer films and authentication labels.

Description of the Related Art

Holographic images may be used for identification and authentication of products and may be applied directly to the products or the product packaging. The most common hologram used is a surface-relief hologram, formed by a patterning and stamping process in which a relief grating is formed on the surface of a recording medium, such as a photoresist material. In a surface-relief hologram, interference planes are predominantly perpendicular to the recording surface and the surface-relief grating of the recording medium provides for the diffraction of incident light, enabling the formation of the observed holographic image. As basic holographic technology becomes more widely available, however, such a simple hologram may be more easily counterfeited and applied to non-authentic products. Therefore, a surface-relief hologram has limited value as an authentication and/or security device.

Another type of hologram is a volume-phase hologram, in which a recording medium is a photosensitive material, such as a silver halide emulsion, a dichromated gelatin or a photopolymer. In a volume-phase hologram, the interference planes are not limited to just being perpendicular to the recording surface (as in surface relief holograms), but can be at a variety of angles with respect to the recording surface. Photo-imaging creates interference fringes throughout the depth of the recording medium that diffract light and create the observed holographic image. Unlike a surface-relief hologram, which does not reflect light, but only diffracts light in transmission, a volume-phase hologram can do both. Volume-phase holograms are more difficult and costly to produce than surface-relief holograms, but enable the production of a more detailed image that has greater three-dimensional character, complete with parallax, and is far more challenging to counterfeit.

A volume-phase hologram is often produced as an authentication label in the form of a multilayer film that is subsequently applied to a product using an adhesive layer. In some cases, counterfeiters will attempt to remove an authentication label from a genuine product or product packaging and reapply it to a non-authentic good. Often this is done by using heat (e.g., a heat gun) to soften the adhesive layer, and then carefully scraping the label off.

It would be desirable to produce an authentication label that cannot be readily removed from one substrate and reapplied to another. For instance, a label that is irreparably damaged upon the application of heat might discourage attempts to remove labels by softening the adhesive. Alternatively, a label that becomes highly frangible after the application of heat might prevent successful removal of the label.

SUMMARY

In a first aspect, a multilayer film includes a holographic image layer, a first heat-shrinkable layer and a first adhesive layer between the holographic image layer and the first heat-shrinkable layer.

In a second aspect, an authentication label includes a holographic image layer; a first heat-shrinkable layer; a first adhesive layer between the holographic image layer and the first heat-shrinkable layer; and, a back adhesive layer.

The foregoing general description and the following detailed description are exemplary and explanatory only and are not restrictive of the invention, as defined in the appended claims.

BRIEF DESCRIPTION OF THE DRAWINGS

The invention is illustrated by way of example and not limitation in the accompanying figures.

Figure 1:
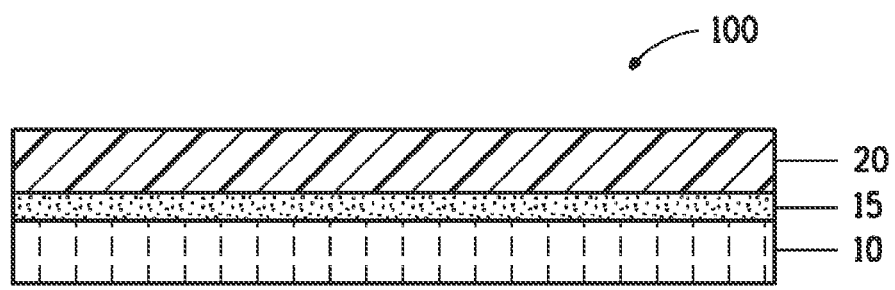
FIG. 1 is a cross-sectional view illustration of one embodiment of a multilayer film.

Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

In a first aspect, a multilayer film includes a holographic image layer, a first heat-shrinkable layer and a first adhesive layer between the holographic image layer and the first heat-shrinkable layer.

In one embodiment of the first aspect, the holographic image layer includes a volume hologram. In a specific embodiment, the volume hologram includes an image recorded in a photopolymer, a silver halide emulsion, a dichromated gelatin, or any combination thereof.

In another embodiment of the first aspect, the holographic image layer further includes a color-tuning layer.

In yet another embodiment of the first aspect, the first heat-shrinkable layer includes a polyester, a polystyrene, a polylactic acid, a polyvinyl chloride, or any combination thereof. In a specific embodiment, the polyester includes a polyethylene terephthalate glycol-modified. In some other embodiment of the first aspect, the first heat-shrinkable layer includes a film selected from polyesters, polystyrenes, polylactic acids, polyvinyl chlorides, or any combination thereof.

In still another embodiment of the first aspect, the first adhesive layer includes a pressure-sensitive adhesive. In a specific embodiment, the pressure-sensitive adhesive includes an acrylic resin, a rubber-based resin, a silicone resin, or any combination thereof. In another specific embodiment, the pressure-sensitive adhesive is selected from acrylic resins, rubber-based resins, silicone resins, or any combination thereof.

In still yet another embodiment of the first aspect, the first adhesive layer includes an ultraviolet-cured adhesive.

In another embodiment of the first aspect, the multilayer film further includes a protective film layer and a second adhesive layer. In a specific embodiment, the protective film layer includes polyethylene terephthalate. In another specific embodiment, the holographic image layer is between the first heat-shrinkable layer and the protective film layer; and, the second adhesive layer is between the holographic image layer and the protective film layer. In yet another specific embodiment, the first heat-shrinkable layer is between the holographic image layer and the protective film layer; and, the second adhesive layer is between the first heat-shrinkable layer and the protective film layer.

In yet another embodiment of the first aspect, the multilayer film further includes a second heat-shrinkable layer adjacent to the holographic film layer on a side opposite the first heat-shrinkable layer; and, a third adhesive layer between the holographic image layer and the second heat-shrinkable layer. In a specific embodiment, the multilayer film further includes a protective film layer and a second adhesive layer. In some specific embodiments, the protective film layer is adjacent a side of the first heat shrinkable layer that is opposite the holographic image layer; and, the second adhesive layer is between the protective layer and the first heat shrinkable layer. In some other specific embodiments, the protective film layer is adjacent a side of the holographic image layer that is opposite the first heat-shrinkable layer; and, the second adhesive layer is between the protective layer and the holographic image layer.

In still another embodiment of the first aspect, the multilayer film further includes a back adhesive layer. In a specific embodiment, the back adhesive layer is adjacent a side of the holographic image layer that is opposite the first heat-shrinkable layer. In another specific embodiment, the back adhesive layer is adjacent a side of the first heat-shrinkable layer that is opposite the holographic image layer.

In still yet another embodiment of the first aspect, the multilayer film further includes an ink layer.

In a second aspect, an authentication label includes a holographic image layer; a first heat-shrinkable layer; a first adhesive layer between the holographic image layer and the first heat-shrinkable layer; and, a back adhesive layer.

In one embodiment of the second aspect, the authentication label further includes a protective film layer and a second adhesive layer. In another specific embodiment, the holographic image layer is between the first heat-shrinkable layer and the protective film layer; and, the second adhesive layer is between the holographic image layer and the protective film layer. In yet another specific embodiment, the first heat-shrinkable layer is between the holographic image layer and the protective film layer; and, the second adhesive layer is between the first heat-shrinkable layer and the protective film layer.

In another embodiment of the second aspect, the authentication label further includes a first ink layer between the holographic image layer and the back adhesive layer; and, a second ink layer on an exterior surface of the first heat-shrinkable layer.

In yet another embodiment of the second aspect, upon heat-shrinking of the first heat-shrinkable layer, the authentication label is damaged.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

Holographic Image Layer

A holographic image layer can include a surface-relief hologram or a volume-phase hologram. In one embodiment, a holographic image layer comprises one or more volume-phase holograms. A holographic image layer may be produced from a recording medium that is a photosensitive material in which one or more holographic images may be recorded in a single layer, i.e., a holographic recording film (HRF). In one embodiment, a photosensitive material may be a photopolymer, a silver halide emulsion or a dichromated gelatin. In a more specific embodiment, a photosensitive material may be a photopolymer. In an even more specific embodiment, a photopolymer may be a free-radical polymerization composition based on acrylate/methacrylate monomers. Examples of photopolymer HRFs include OmniDex® 717A (10 um) and OmniDex® 734 (20 um) (both from the DuPont Co., Wilmington, Del.).

In one embodiment, an image can be produced from a HRF in conjunction with a color-tuning film (CTF) which functions as a dry diffusion element containing monomers that swell the imaged HRF, resulting in a hologram that has increased brightness and a wider angle of view. Examples of CTFs included CTF123 and CTF146 (both from DuPont).

A holographic image layer can have a thickness in one embodiment of from about 1 to about 100 µm, or in other embodiments from about 5 to about 75 µm, or in yet other embodiments from about 10 to about 50 µm.

Heat-Shrinkable Layers

In one embodiment, a heat-shrinkable layer comprises a plastic film that shrinks when heat is applied. In one embodiment, a heat-shrinkable plastic film can be any film commonly used in the shrink sleeve/shrink band industry, such as a polyester film, a polystyrene film, a polylactic acid film or a polyvinyl chloride film. In a more specific embodiment, a polyester film may be a polyethylene terephthalate (PET) film, such as an oriented film of PET glycol-modified (PETG). Examples of heat-shrinkable PETG films include Bonpet 5A, Bonpet 6L and Bonpet 8A (all from Bonset America Corp., Browns Summit, N.C.). Examples of heat-shrinkable PVC films include SRAE, SRHS, SRUB, SRHSU, SRHI and SRHL (all from Bonset America). In one embodiment, a heat-shrinkable layer may be a transparent film.

For typical heat-shrinkable films, when heat in the range of from about 55 to about 100° C. is applied for a sufficient amount of time, the films can shrink at least about 5 to 10% in one or more directions. Those skilled in the art will appreciate that a wide range of processing conditions (e.g., time and temperature) can be used to shrink heat-shrinkable films. A heat-shrinkable layer can have a thickness in one embodiment of from about 25 to about 250 µm, or in other embodiment from about 30 to about 150 µm, or in yet another embodiment from about 40 to about 75 µm.

Adhesive Layers

In one embodiment, an adhesive layer comprises a pressure-sensitive adhesive. In a specific embodiment, a pressure-sensitive adhesive can include an acrylic resin, a rubber-based resin, a silicone resin or a mixture thereof. Examples of acrylic-based pressure-sensitive adhesives include V-302ULP, V-778, V-29 and EXA-316 (all from FLEXcon Inc., Spencer, Mass.). In one embodiment, an adhesive layer can include an ultraviolet-cured adhesive.

In one embodiment, an authentication label can be a multilayer film and can include one or more adhesive layers. In a specific embodiment, one or more adhesive layers may be used to adhere a holographic image layer to a heat-shrinkable layer, a protective film layer, or both. In a further embodiment, an additional adhesive layer can be a back adhesive layer that can be used to adhere an authentication label to a substrate. The adhesive layer that can be used to adhere a holographic image layer to a heat-shrinkable layer can have a thickness in one embodiment of from about 5 to about 100 µm, or in another embodiment from about 5 to about 75 µm, or in yet another embodiment from about 10 to about 50 µm.

Additional Layers

In one embodiment, a protective film layer can be used as a top layer of a multilayer film to protect the other layers (i.e., holographic image layer, first adhesive layer, first heat-shrinkable layer) that underlay the top layer from damage. In some embodiments, the protective film layer is an outermost layer of the multilayer film, where the other layers of the multilayer film are between the outermost layer and a substrate that is being labeled. A polyester film that is not heat-shrinkable can be used to protect an authentication label from damage under ordinary use conditions.

In one embodiment, a multilayer film can further include one or more ink layers. In one embodiment, the ink layer(s) can be located at a variety of positions within (i.e., on, or between, or adjacent to, any layer of) the multilayer film, including in front of and behind the holographic image layer (from the perspective that one would view the holographic image). In one embodiment, ink layer(s) can be present on one or both exterior surfaces, i.e., exterior surface of an outermost layer, of a multilayer film. In some embodiments, ink layer(s) can provide additional security features for an authentication label that includes the multilayer film. In one embodiment, a multilayer film adhered to a substrate may include an ink layer between the multilayer film and the substrate. An example of an ink layer can include a patterned or un-patterned pigmented resin layer that allows a certain color to be viewed through the holographic image layer when viewed at certain angles. Another example of an ink layer can include a printed image that can be printed directly onto the holographic image layer, by flexographic printing for example. Another example of an ink layer can include a patterned layer, such as a serial number or a bar code, printed on an exterior surface, such as the front side, of a multilayer film. A variety of printing processes (e.g., flexographic printing, thermal transfer printing, etc.) may be used to print an ink layer; depending upon the layer, the ink, and the information that is being printed.

Prior to adhering an authentication label to a substrate, a multilayer film that forms the authentication label can further include a back adhesive layer and a release liner. In most embodiments, the back adhesive and release liner are adjacent a side of the multilayer film that will attach to the substrate (i.e., opposite the exterior surface of the multilayer film from which the authentication label will be viewed). The back adhesive layer can include a pressure-sensitive adhesive such as an acrylic resin, a rubber-based resin, a silicone resin or a mixture thereof. The release liner can be a silicone release PET or paper liner and is used to protect the back adhesive layer until the authentication label is ready to be adhered to the substrate, at which point the liner is removed.

The substrate is not limited and can include products or goods of tangible items such as, for example, articles, commodities, materials, merchandise, supplies, and wares; components of the products or goods; packages or packaging for the products or goods; and labels. A multilayer film on a substrate that is another label, that can include other information, can be referred to as a label-on-label construction.

Multilayer Films

The presence of a heat-shrinkable layer in the multilayer film or in an authentication label provides a means to impede, prevent, and/or render evident tampering, of the transfer of the multilayer film or the authentication label from one substrate to another substrate. Since heat is often applied to the multilayer film or the authentication label to soften the adhesive and facilitate separation from a substrate, the presence of the heat-shrinkable layer can cause the multilayer film or authentication label to be damaged, and often to be irreparably damaged. In some cases, the application of heat to the multilayer film that includes the heat-shrinkable film causes the first heat-shrinkable layer to shrivel or shrink, which can render the holographic image layer unprotected in whole or in part. After heating, the heat-shrinkable layer can form a shriveled ball or blob that can lightly adhere to the holographic image layer, but the shriveled ball or blob can be easily detached with a stream of air from a hot air gun, for example. Since the holographic image layer is highly frangible, the multilayer film cannot be separated or removed from the substrate without irreparable damage to the unprotected holographic image layer. In other cases, the application of heat to the multilayer film that includes the heat-shrinkable film causes the first heat-shrinkable layer and the holographic image layer to curl and/or wrinkle, thereby irreparably damaging the multilayer film (or label).

FIG. 1 illustrates one embodiment of a multilayer film 100 that includes a holographic image layer 10, a first heat-shrinkable layer 20 and a first adhesive layer 15 between the holographic image layer 10 and the first heat-shrinkable image layer 20. A back adhesive layer (not shown) may be used to adhere or attach the multilayer film 100 to a substrate. In one embodiment where the multilayer film 100 is adhered by a back adhesive layer to a substrate via the holographic image layer 10, upon application of heat, the first heat-shrinkable layer 20 can shrivel up leaving behind a highly frangible holographic image layer 10 that cannot be removed from the substrate without irreparable damage; or, the first heat-shrinkable layer 20 along with the holographic image layer 10 can curl and/or wrinkle to the point of being irreparably damaged. Those skilled in the art will appreciate that the choice of materials for the different layers, their thicknesses and other factors will determine how well the layers adhere to each other, which in turn may determine whether the first heat-shrinkable layer 20 will shrivel on its own, or curl and wrinkle along with the holographic image layer 10.

In another embodiment, where the authentication label is adhered by a back adhesive layer to the substrate via the first heat-shrinkable layer 20, upon exposure to heat, the first heat-shrinkable layer 20 along with the holographic image layer 10 may curl and wrinkle to the point of being irreparably damaged.

Figure 2:
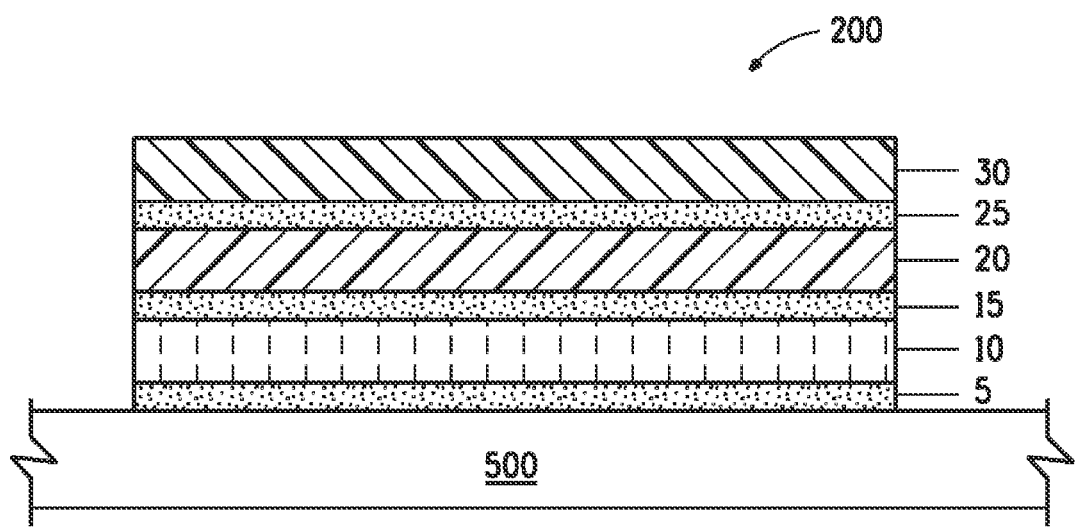
FIG. 2 is a cross-sectional view illustration of one embodiment of a multilayer film adhered to a substrate.

FIG. 2 illustrates an embodiment of a multilayer film 200 adhered to a substrate 500. In this embodiment, the multilayer film 200 is adhered to the substrate 500 via a holographic image layer 10 using a back adhesive layer 5. A first heat-shrinkable layer 20 is adhered to the holographic image layer 10 using a first adhesive layer 15, and a protective film layer 30 is adhered to the first heat-shrinkable layer 20 using a second adhesive layer 25. Upon exposure to heat, the first heat-shrinkable layer 20 may shrivel up, leaving behind a highly frangible holographic image layer 10 that cannot be removed from the substrate 500 without irreparable damage, or the first heat-shrinkable layer 20 along with the holographic image layer 10 may curl and wrinkle to the point of being irreparably damaged.

Figure 3:
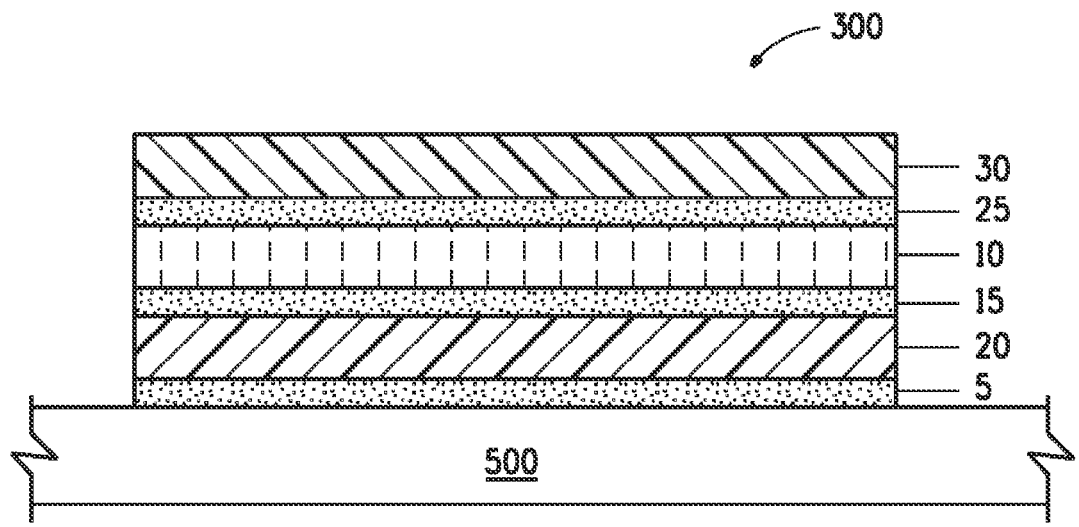
FIG. 3 is a cross-sectional view illustration of one embodiment of a multilayer film adhered to a substrate.

FIG. 3 illustrates an embodiment of a multilayer film 300 adhered to a substrate 500. In this embodiment, the multilayer film 300 is adhered to the substrate 500 via a first heat-shrinkable layer 20 using a back adhesive layer 5. A holographic image layer 10 is adhered to the first heat-shrinkable layer 20 using a first adhesive layer 15, and a protective film layer 30 is adhered to the holographic image layer 10 using a second adhesive layer 25. Upon exposure to heat, the first heat-shrinkable layer 20 along with the holographic image layer 10 may curl and wrinkle to the point of being irreparably damaged.

Figure 4:
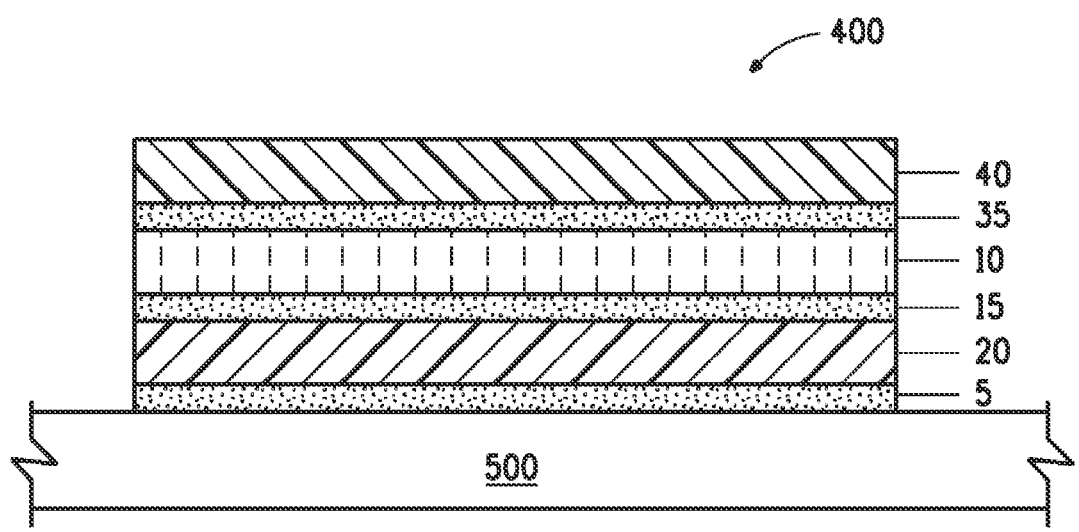
FIG. 4 is a cross-sectional view illustration of one embodiment of a multilayer film adhered to a substrate.

FIG. 4 illustrates an embodiment of a multilayer film 400 adhered to a substrate 500. In this embodiment, the multilayer film 400 is adhered to the substrate 500 via a first heat-shrinkable layer 20 using a back adhesive layer 5. A holographic image layer 10 is adhered to the first heat-shrinkable layer 20 using a first adhesive layer 15, and a second heat-shrinkable layer 40 is adhered to the holographic image layer 10 using a third adhesive layer 35. In a specific embodiment, a protective film layer (not shown) can be included and attached to the multilayer film with a second adhesive layer (not shown), typically on a side of the multilayer film that is opposite the side adhered to the substrate. Upon exposure to heat, the first and second heat shrinkable layers 20 and 40, respectively, along with the holographic image layer 10 may curl and wrinkle to the point of being irreparably damaged.

Assembly of the multilayer film can include one or more laminating steps to bring into intimate contact a side of each of at least two separate layers, and thereby form a multilayered film structure. Lamination may or may not include the application of heat and/or pressure during assembly.

In some embodiments in which the holographic image layer is formed from a photopolymeric holographic recording film, the formation of the holographic image layer can include one or more steps that can be facilitated by the application of heat, such as for example, the lamination of a color tuning film to the imaged holographic recording film. In such embodiments, it may be useful to complete the formation of the holographic image layer prior to assembly of the multilayer film of the holographic image layer with the heat-shrinkable film.

Authentication Label

An authentication label using a multilayer film that includes a holographic image layer and a first heat-shrinkable layer may be used for identification and authentication of products and may be applied directly to the products or the product packaging. The authentication label cannot be readily removed from one substrate and reapplied to another. In one embodiment, a label may be irreparably damaged upon the application of heat. In another embodiment, a label becomes highly frangible after the application of heat and might prevent successful removal of the label.

EXAMPLES

The concepts described herein will be further described in the following examples, which do not limit the scope of the invention described in the claims.

Example 1

A photopolymer holographic recording film (HRF), OmniDex® 717A (DuPont), was holographically imaged at 476 nm and 532 nm with argon ion and VERDI solid state lasers (Coherent Inc., Santa Clara, Calif.), respectively, to record a copy of a master hologram in the HRF. The imaged HRF was then given a blanket UVA exposure (100 mJ/cm$^2$), followed by hot lamination to a photopolymer color tuning film (CTF), CTF123 (DuPont), at 100° C. and 3 meters per minute. The resulting laminate was then heat processed at 150° C. for 8 minutes.

After heat processing the HRF/CTF laminate, the polyester (PET) liner on the CTF layer was removed and a black thermal transfer film (TTR-6937, Coding Products, Kalkaska, Mich.), consisting of a black-pigmented resin layer on a polypropylene carrier film, was hot-laminated to the CTF layer at 100° C. and 3 meters per minute. The polypropylene carrier film was then removed from the laminate, and a pressure-sensitive transfer adhesive (1 mil V-778 acrylic-based adhesive on 2 mil POLY H-9 silicone-release PET film liner, FLEXcon Inc., Spencer, Mass.) was laminated to the black resin layer at room temperature and 3 meters per minute. The PET liner on the HRF layer was then removed and a pressure-sensitive tape with a heat-shrinkable film (0.7 mil V-302ULP acrylic-based adhesive on 2 mil PETG film facestock, FLEXcon) was laminated to the imaged HRF layer at room temperature and 3 meters per minute, giving a multilayer film having a structure in order of heat-shrinkable film/adhesive/imaged HRF/CTF/pigmented resin/back adhesive/release liner.

The multilayer film was then cut into 20 mm×20 mm labels and security slits were introduced at the label edges. The release liner was removed and the label was adhered to a high density polyethylene (HDPE) jar via the back adhesive layer. With the use of a hot air gun, the label on the jar was exposed to heated air and within 5 seconds, the heat-shrinkable PETG layer shriveled up, leaving behind a highly frangible holographic image layer which could not be removed from the jar without irreparable damage.

Example 2

The procedure of Example 1 was repeated, using 1 mil V-302ULP on 1.6 mil PETG film facestock as the adhesive/heat-shrinkable film combination, and 2 mil V-367 rubber-based adhesive on 2 mil POLY H-9 (FLEXcon) as the back adhesive and silicone-release PET film liner, respectively.

A label was prepared as described in Example 1 and adhered to a HDPE jar. With the use of a hot air gun, the label on the jar was exposed to heated air and within 5 seconds, the label curled and wrinkled severely to the point it was irreparably damaged.

Example 3

A photopolymer HRF, OmniDex® 734 (DuPont), was holographically imaged at 514 nm with an argon ion laser to record a copy of a master hologram in the HRF. The imaged HRF was then given a blanket UVA exposure (100 mJ/cm$^2$), followed by hot lamination to a photopolymer color tuning film, CTF146 (DuPont) at 100° C. and 3 meters per minute. The resulting laminate was then heat processed at 150° C. for 8 minutes.

After heat processing the HRF/CTF laminate, the PET liner on the HRF layer was removed and a pressure-sensitive tape (1 mil V-302ULP adhesive on 1 mil PET film facestock) was laminated to the imaged HRF layer at room temperature and 53 meters per minute to provide a protective film layer and a second adhesive layer. The PET liner on the CTF layer was then removed, the CTF surface corona-treated and a water-based black ink (OptaFilm Process Black, Actega WIT, Inc., Lincolnton, N.C.) flexographically printed directly on the CTF layer. A pressure-sensitive transfer adhesive (1 mil V-29 acrylic-based adhesive on 55 pound basis weight 2-side silicone-release-coated LA K paper liner, FLEXcon) was laminated to 2 mil PETG film (Bonpet® 5A, Bonset America) at room temperature and 3 meters per minute. The silicone-release paper liner was then removed from the PETG/adhesive film laminate and the latter laminated to the ink layer at room temperature and 3 meters per minute. In a last lamination step, a pressure-sensitive transfer adhesive (1 mil EXA-316 acrylic-based adhesive on 50 pound basis weight silicone-release SCK L-4 paper liner, FLEXcon) was laminated to the 2 mil PETG heat-shrinkable film layer giving a multilayer film having a structure of protective film/adhesive/imaged HRF/CTF/ink/adhesive/heat-shrinkable film/back adhesive/release liner.

A label was prepared as described in Example 1 and adhered to a glass substrate. With the use of a hot air gun, the label on the glass substrate was exposed to heated air and within 5 seconds, the label curled and wrinkled severely to the point it was irreparably damaged.

Example 4

The procedure of Example 3 was repeated, except that the label was adhered to a cardboard substrate instead of glass. With the use of a hot air gun, the label on the cardboard substrate was exposed to heated air and within 5 seconds, the label curled and wrinkled severely to the point it was irreparably damaged.

Example 5

A photopolymer HRF/CTF laminate was prepared as in Example 1. A pressure-sensitive transfer adhesive (1 mil V-29 acrylic-based adhesive on 55 pound basis weight 2-side silicone-release-coated LA K paper liner) was laminated to 2 mil PETG film (Bonpet® 5A) at room temperature and 3 meters per minute to form a heat-shrinkable layer with an adhesive layer. The silicone-release paper liner was then removed from the PETG/adhesive film laminate and the latter laminated to the HRF layer after removing its PET liner. A second PETG/adhesive film laminate was laminated to the CTF layer after removing its PET liner. All laminations were conducted at room temperature and 3 meters per minute. In a last lamination step, a pressure-sensitive transfer adhesive (1 mil EXA-316 acrylic-based adhesive on 50 pound basis weight silicone-release SCK L-4 paper liner) was laminated to the 2 mil PETG film layer that had been bonded to the CTF layer giving a multilayer film having the structure of heat shrinkable film/adhesive/imaged HRF/CTF/adhesive/heat shrinkable film/back adhesive/release liner.

A label was prepared as described in Example 1 and adhered to a glass substrate. With the use of a hot air gun, the label on the glass substrate was exposed to heated air and within 10 seconds, the label curled and wrinkled severely to the point it was irreparably damaged.

Example 6

A photopolymer HRF/CTF laminate was prepared as in Example 1. A pressure-sensitive transfer adhesive (1 mil V-29 acrylic-based adhesive on 55 pound basis weight 2-side silicone-release-coated LA K paper liner) was laminated to 2 mil PVC shrink film (TRACO Manufacturing, Inc., Orem, Utah). The silicone-release paper liner was then removed from the PVC/adhesive film laminate and the latter laminated to the HRF layer after removing its PET liner. The V-29 transfer adhesive along with its paper release liner was then laminated to the CTF layer after removing its PET liner giving a multilayer film having the structure of heat-shrinkable film/adhesive/imaged HRF/CTF/adhesive/release liner. All laminations were conducted at room temperature and 3 meters per minute.

A label was prepared as described in Example 1 and adhered to a glass substrate. With the use of a hot air gun, the label on the glass substrate was exposed to heated air and within 5 seconds, the label curled and wrinkled severely to the point it was irreparably damaged.

Example 7

A photopolymer HRF/CTF laminate was prepared as in Example 1. A pressure-sensitive tape (0.7 mil V-302ULP acrylic-based adhesive on 2 mil PETG film facestock) was laminated to the imaged HRF layer at room temperature and 53 meters per minute. The PET liner on the CTF layer was then removed, the CTF surface corona-treated and a water-based black ink (OptaFilm Process Black) was flexographically printed directly on the CTF layer. A pressure-sensitive transfer adhesive (1.5 mil V-778 acrylic-based adhesive on 2 mil POLY H-9 silicone-release PET film liner) was laminated at room temperature and 53 meters per minute to the black ink layer giving a multilayer film having the structure of heat-shrinkable film/adhesive/imaged HRF/CTF/ink/adhesive/release liner.

Labels containing security slits were prepared by rotary die-cutting the multilayer film described above. The release liner was removed and the label then applied to a glass substrate. With the use of a hot air gun, the label on the glass was exposed to heated air and within 5 seconds, the PETG layer on top of the label shriveled up, leaving behind the highly frangible label which could not be removed from the glass without irreparable damage.

Example 8

The procedure of Example 7 was repeated with the exception that the label was adhered to a high density polyethylene lid having a smooth surface instead of a glass substrate. With the use of a hot air gun, the label on the HDPE lid was exposed to heated air and within 5 seconds, the PETG layer on top of the label shriveled up, leaving behind the highly frangible label which could not be removed from the lid without irreparable damage.

Example 9

The procedure of Example 7 was repeated with the exception that the label was adhered to a high density polyethylene lid having a highly textured surface instead of a glass substrate. With the use of a hot air gun, the label on the HDPE lid was exposed to heated air and within 5 seconds, the label wrinkled severely to the point it was irreparably damaged.

Note that not all of the activities described above in the general description or the examples are required, that a portion of a specific activity may not be required, and one or more further activities may be performed in addition to those described. Still further, the order in which activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that one or more modifications or one or more other changes can be made without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof has been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all of the claims.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any sub-combination. Further, reference to values stated in ranges include each and every value within that range.

What is claimed is:

1. A multilayer film comprising:
   a holographic image layer;
   a first heat-shrinkable layer;
   a first adhesive layer between the holographic image layer and the first heat-shrinkable layer;
   a second heat-shrinkable layer adhered to the holographic image layer on a side opposite the first heat-shrinkable layer; and
   a third adhesive layer between the holographic image layer and the second heat-shrinkable layer,
   and wherein the holographic image layer comprises a volume hologram.

2. The multilayer film of claim 1, wherein the volume hologram comprises an image recorded in a photopolymer, a silver halide emulsion, a dichromated gelatin, or any combination thereof.

3. The multilayer film of claim 1, wherein the holographic image layer further comprises a color-tuning layer.

4. The multilayer film of claim 1, wherein the first heat-shrinkable layer is selected from a polyester film, a polystyrene film, a polylactic acid film, a polyvinyl chloride film, or any combination thereof.

5. The multilayer film of claim 4, wherein the first heat-shrinkable layer comprises polyethylene terephthalate glycol-modified film as the polyester film.

6. The multilayer film of claim 1, wherein the first adhesive layer comprises a pressure-sensitive adhesive.

7. The multilayer film of claim 6, wherein the pressure-sensitive adhesive is selected from an acrylic resin, a rubber-based resin, a silicone resin, or any combination thereof.

8. The multilayer film of claim 1, wherein the first adhesive layer comprises an ultraviolet-cured adhesive.

9. The multilayer film of claim 1, further comprising a protective film layer and a second adhesive layer.

10. The multilayer film of claim 9, wherein the protective film layer comprises polyethylene terephthalate.

11. The multilayer film of claim 9, wherein the holographic image layer is between the first heat-shrinkable layer and the protective film layer and the second adhesive layer is between the holographic image layer and the protective film layer.

12. The multilayer film of claim 9, wherein the first heat-shrinkable layer is between the holographic image layer and the protective film layer and the second adhesive layer is between the first heat-shrinkable layer and the protective film layer.

13. The multilayer film of claim 1 further comprising an ink layer.

14. A multilayer film comprising:
   a holographic image layer;
   a first heat-shrinkable layer;
   a first adhesive layer between the holographic image layer and the first heat-shrinkable layer; wherein
   on heating, the first heat-shrinkable layer shrivels or shrinks such that at least a part of the holographic image layer is unprotected.

15. The multilayer film of claim 14, further comprising:
   a back adhesive layer, wherein the back adhesive layer is adjacent to a side of the holographic image layer that is opposite the first heat-shrinkable layer and is adhered to a substrate.

16. The multilayer film of claim 14, wherein the holographic image layer comprises a volume hologram.

17. An authentication label comprising:
   a holographic image layer;
   a first heat-shrinkable layer;
   a first adhesive layer between the holographic image layer and the first heat-shrinkable layer; and
   a back adhesive layer, wherein the holographic image layer is between the back adhesive layer and the first adhesive layer, and wherein on heating, the first heat-shrinkable layer shrivels or shrinks such that at least a part of the holographic image layer is unprotected.

18. The authentication label of claim 17, further comprising a protective film layer and a second adhesive layer, wherein the second adhesive layer is between the protective film and a side of the first heat-shrinkable layer that is opposite the first adhesive layer.

19. The authentication label of claim 17 further comprising a first ink layer between the holographic image layer and the back adhesive layer and a second ink layer on an exterior surface of the first heat-shrinkable layer.

20. The authentication label of claim 19, wherein the back adhesive layer is adjacent to the side of the holographic image layer that is opposite the first heat-shrinkable layer and is adhered to a substrate.

21. The authentication label of claim 19, wherein the holographic image layer comprises a volume hologram.

22. The authentication label of claim 21, wherein the volume hologram comprises an image recorded in a photopolymer, a silver halide emulsion, a dichromated gelatin, or any combination thereof.

23. The authentication label of claim 17, wherein the holographic image layer further comprises a color-tuning layer.

24. The authentication label of claim 17, wherein the first heat-shrinkable layer is selected from a polyester film, a polystyrene film, a polylactic acid film, a polyvinyl chloride film, or any combination thereof.

25. The authentication label of claim 24, wherein the first heat-shrinkable layer comprises a polyethylene terephthalate glycol-modified film as the polyester film.

26. The authentication label of claim 17, wherein the first adhesive layer comprises a pressure-sensitive adhesive.

* * * * *